United States Patent Office 3,449,262
Patented June 10, 1969

3,449,262
CORROSION INHIBITION
Wesley L. Archer and Miriam Harter, Midland, Mich., assignors to The Dow Chemical Company, Midland, Mich., a corporation of Delaware
No Drawing. Filed Jan. 28, 1966, Ser. No. 523,561
Int. Cl. C23f 11/14, 11/12
U.S. Cl. 252—396  4 Claims

ABSTRACT OF THE DISCLOSURE

Methyl chloroform is stabilized to prevent corrosion of iron in the presence of water by the inclusion of an inorganic benzoate or naphthoate wherein the inorganic cation is any of various multivalent metals and the ammonium group.

---

This invention relates to the preparation and use of methyl chloroform compositions which are stabilized against decomposition due to corrosion activity in the presence of iron and water.

The corrosion of iron in the presence of methyl chloroform and $H_2O$ produces organic decomposition products in addition to inorganic iron oxides and/or other iron salts. The production of these organic decomposition products is believed to be due to the catalytic action of the iron compounds initially formed.

According to the present invention, the corrosion of iron in the presence of methyl chloroform and at least a catalytic amount of water is retarded by incorporating an inhibiting amount of certain benzoate salts into the methyl chloroform. The benzoate salts which may be used are represented by the ionic formula

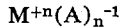

wherein M is a metallic element or an ammonium group with a valence of $n$ (wherein $n$ is an integer of from 1 to 6), and $(A)^{-1}$ represents the benzoate anion $(C_7H_5O_2)^{-1}$, a naphthoate anion $(C_{11}H_7O_2)^{-1}$, or a nuclear-substituted benzoate anion containing from 1 to 5 monovalent substituents (which may be the same or different) wherein each substituent is selected from the group consisting of a halogen (Cl, Br, I, F), —$NO_2$, phenoxy, and a $C_{1-12}$ alkyl group. A preferred group of benzoate anions $(A)^{-1}$ is represented by the formula:

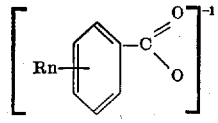

wherein $n$ is an integer of from 0 to 5 representing the number of nuclear substituents, each R is independently selected from the group consisting of Cl, Br, $NO_2$, phenoxy, and an alkyl group of from 1 to 12 carbon atoms, and every unsubstituted nuclear carbon atom is bonded to a hydrogen atom. Suitable metal elements which may form the cationic portion of the salt include magnesium, scandium, lanthanum, titanium, chromium, manganese, iron, cobalt, nickel, zinc, aluminum, tin, lead, tellurium, cerium, europium and gadolinium. Compounds in which the metal moiety is in a stable (usually higher) valence state are preferred in the system. For convenience, the term "benzoate salts" is defined to include salts of both substituted and unsubstituted benzoates, including the naphthoate group.

The amount of benzoate salt incorporated into the methyl chloroform may vary widely. Only an amount sufficient to give the desired degree of corrosion reduction is required. Amounts in excess of that required to form a saturated solution may be used. Corrosion rates are decreased using relatively low concentrations of benzoate salt inhibitors, generally from about 0.1 p.p.m. to 3000 p.p.m. of the metal ion as the benzoate salt based upon the total weight of the methyl chloroform-containing composition. The benzoate salt inhibitors are compatible with other types of inhibitor systems. For example, benzoate salts may be added to methyl chloroform compositions which are already inhibited specifically to prevent the decomposition of the methyl chloroform by reaction with aluminium and/or other metals, e.g. zinc, iron, brass etc. The addition of such benzoate salts prevents the loss or destruction of other inhibitors (such as nitromethane, butylene oxide, and, to a lesser extent, dioxane, alcohols and mixtures thereof) due to iron corrosion. For example, storage in an iron container of a methyl chloroform composition which is inhibited with nitromethane against the action of aluminum (but not against iron corrosion) results in a loss of inhibitor due to reactions induced by the products of the iron corrosion.

The benzoate salt inhibitors are effective in retarding corrosion when incorporated into a system containing methyl chloroform, water and iron (including iron-containing alloys). Such systems (which may contain up to about 5–25 percent by weight of water) result in irreversible decomposition of the methyl chloroform with the simultaneous formation of unwanted organic products such as vinylidene chloride and polymers of indeterminate structure. The benzoate salt inhibitors effectively prevent the formation of such organic decomposition products by retarding the corrosion reaction of the iron in this system.

The benzoate salt inhibitors are especially effective in the liquid phase up to temperatures at which thermal decomposition of methyl chloroform occurs (i.e., about 360° C.).

The following examples are submitted for the purpose of illustration only and are not to be construed as limiting the scope of the invention in any way.

Examples 1–32—General Method

Solutions were prepared (total volume of 50 milliliters) composed of 0.5 percent by weight of water, a given concentration of benzoate salt inhibitor and the remainder methyl chloroform. Polished iron nails (AISI–SAE classification number 1025 steel with about 0.25 percent carbon) 2.5 inches long and ⅛ inch in diameter, were added to each sample. Each solution was added to a four ounce test bottle. A plastic seal was placed under the cap of the test bottle to prevent evaporation before the cap was sealed. The sample bottles were large enough to enable about ⅓ to ½ of the length of the nail to protrude from the surface of the methyl chloroform compositions. The samples of wet methyl chloroform in contact with iron were then heated in an oven at a temperature of approximately 57° C. for a period of seven days. Controls composed of wet methyl chloroform in contact with iron, but without benzoate salt inhibitors, were carried through the same procedure. After seven days, the samples were examined to determine the extent of the iron corrosion. The samples were rated as follows:

| Property measured | Activity Rating Symbol | Explanation |
|---|---|---|
| Inhibition of iron corrosion in the liquid phase | 0 | No corrosion inhibition. |
| | 1 | Slight corrosion inhibition. |
| | 2 | Good corrosion inhibition. |

TABLE II

| Example Number: | Salt | Weight Concentration (parts per million p.p.m. as the metal ion) | Activity |
|---|---|---|---|
| 26 | Cobalt (II) p-phenoxy benzoate | <50 | 2 |
| 27 | Ceric naphthoate | <50 | 2 |
| 28 | Cobalt (II) p-dodecyl benzoate | <50 | 2 |
| 29 | Cobalt (II) p-nonylbenzoate | <50 | 2 |
| 30 | Manganese (II) p-nitrobenzoate | 1 | 2 |
| 31 | Manganese (II) 2,5-dimethylbenzoate | 190 | 2 |
| 32 | Manganese (II) p-chlorobenzoate | 6 | 2 |

No inhibition.—Iron sample covered with a heavy crusting of a mixture of organic and inorganic corrosion products.

Slight inhibition.—Some areas of iron sample remain clean; colored film may form.

Good inhibition.—Clean shiny surface; may be a few small spots of discoloration. No crust formation.

The results are summarized in Tables I and II. The methyl chloroform employed in Examples 1–21 and 26–32 was commercial grade containing the following inhibitors (all percentages by weight): (1) 3.5–4.0 percent dioxane; (2) 0.5 percent nitromethane; and (3) 0.5 percent butylene oxide. For comparison purposes, pure (99.3 percent) methyl chloroform containing no inhibitor was employed in Examples 22–25. In a similar manner, typical substituted benzoate salts were employed as corrosion inhibitors in Examples 26–32 (summarized in Table II).

TABLE 1

| Example Number: | Benzoate Salt of— | Weight Concentration (parts per million p.p.m. as the metal ion) | Activity |
|---|---|---|---|
| 1 | Aluminum (III) | 3 | 2 |
| 2 | Ammonium (I) | [1] 900 | 2 |
| 3 | Cerous (III) | 10 | 2 |
| 4 | Chromium (III) | 160 | 2 |
| 5 | Cobalt (II) | 3 | 2 |
| 6 | Europium (II) | 49 | 2 |
| 7 | Ferric (III) | 160 | 2 |
| 8 | Ferrous (II) | 1,500 | 2 |
| 9 | Gadolinium (III) | 50 | 2 |
| 10 | Lanthanum (III) | 300 | 2 |
| 11 | Lead (II) | 78 | 2 |
| 12 | Magnesium (II) | 96 | 2 |
| 13 | Manganese (II) | 22 | 2 |
| 14 | Nickel (II) | 5 | 2 |
| 15 | Scandium (III) | 1,200 | 2 |
| 16 | Tellurium (IV) | 30 | 2 |
| 17 | Tellurium (II) | <5 | 1 |
| 18 | Tin (IV) | 1,400 | 2 |
| 19 | Tin (II) | 29 | 1 |
| 20 | Titanium (II) | 30 | 2 |
| 21 | Zinc (II) | 190 | 2 |
| 22 | Nickel | [2] ≈5 | 1 |
| 23 | Cerous (III) | [2] ≈10 | 2 |
| 24 | Aluminum (III) | [2] ≈3 | 1 |
| 25 | Cobalt (III) | [2] ≈3 | 2 |

[1] Based on NH₃.
[2] The symbol ≈ indicates an approximate concentration.

We claim as our invention:
1. Methyl chloroform stabilized against iron corrosion in the presence of water by having incorporated therein an inhibiting amount of a salt of the formula

$$M^{+n}(A)_n^{-1}$$

wherein:
 (a) $n$ is an integer of from 1 to 6,
 (b) A is selected from the group consisting of the benzoate anion, the naphthoate anion, and a nuclear substituted benzoate anion in which each substituent is independently selected from the group consisting of: a halogen, nitro, phenoxy, and a $C_{1-12}$ alkyl, and
 (c) M is selected from the group consisting of magnesium, scandium, lanthanum, titanium, chromium, manganese, iron, cobalt, nickel, zinc, aluminum, tin, lead, tellurium, cerium, europium, gadolinium, and $NH_4$.

2. A composition in accordance with claim 1 wherein the concentration of the salt is from about 0.1 part per million to 3000 parts per million based upon the total weight of said composition.

3. A composition in accordance with claim 1 which contains up to 10 percent by weight of water.

4. A method of inhibiting the corrosion of iron in the presence of methyl chloroform and water which comprises contacting the water-methyl chloroform mixture with an inhibiting amount of a salt as defined in claim 1.

References Cited

UNITED STATES PATENTS

| 2,395,307 | 2/1946 | Weber et al. |
| 2,472,503 | 6/1949 | Van der Minne et al. __ 252—396 |
| 2,598,496 | 5/1952 | Bradley et al. _____ 260—515 |
| 2,959,623 | 11/1960 | Drag et al. _____ 260—652.5 |
| 3,265,747 | 8/1966 | Cormany et al. _____ 252—407 |

LEON D. ROSDOL, *Primary Examiner.*

W. SCHULZ, *Assistant Examiner.*

U.S. Cl. X.R.

21—2.7; 252—407; 260—652.5